US012348666B2

(12) United States Patent
Ahn et al.

(10) Patent No.: US 12,348,666 B2
(45) Date of Patent: Jul. 1, 2025

(54) ELECTRONIC DEVICE INCLUDING MULTIPLE DISPLAYS AND METHOD FOR OPERATING THE SAME

(71) Applicant: Samsung Electronics Co., Ltd., Suwon-si (KR)

(72) Inventors: Byeongyong Ahn, Suwon-si (KR); Seongsin Kwak, Suwon-si (KR); Sungoh Kim, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 17/940,456

(22) Filed: Sep. 8, 2022

(65) Prior Publication Data

US 2023/0110484 A1 Apr. 13, 2023

Related U.S. Application Data

(63) Continuation of application No. PCT/KR2022/012698, filed on Aug. 25, 2022.

(30) Foreign Application Priority Data

Oct. 13, 2021 (KR) .................. 10-2021-0136066

(51) Int. Cl.
*H04M 1/72463* (2021.01)
*G06F 3/01* (2006.01)
(Continued)

(52) U.S. Cl.
CPC ....... *H04M 1/724631* (2022.02); *G06F 3/011* (2013.01); *G06F 3/017* (2013.01);
(Continued)

(58) Field of Classification Search
CPC ......... H04M 1/724631; H04M 1/0214; H04M 1/72403; H04M 2250/16; H04M 2250/52;
(Continued)

(56) References Cited

U.S. PATENT DOCUMENTS 12,069,364 B2 * 8/2024 Zhang .................. H04N 23/632
2013/0293488 A1 11/2013 Na et al.
(Continued)

FOREIGN PATENT DOCUMENTS

CN 111263005 A 6/2020
KR 10-2011-0062646 A 6/2011
(Continued)

OTHER PUBLICATIONS

International Search Report and written opinion Nov. 29, 2022, issued in International Application No. PCT/KR2022/012698.

*Primary Examiner* — Hirdepal Singh
(74) *Attorney, Agent, or Firm* — Jefferson IP Law, LLP

(57) ABSTRACT

An electronic device is provided. The electronic device includes a camera module, a first display, a second display, and at least one processor. The at least one processor may be configured to display a first screen and a second screen for displaying at least one function of a camera application on the first display facing in a first direction and the second display facing in a second direction opposite to the first direction, respectively, wherein at least one of the first screen or the second screen includes an image obtained through the camera module, identify a first input for selecting a first function of the camera application through the first screen, identify a second input related to a subject's gaze or gesture in a state in which the first function of the camera application is selected through the first screen, and display, on the second screen, in a state in which the first function of the camera application is selected through the first screen, an indication indicating that selection of the first function by (Continued)

the second input related to the subject's gaze or gesture is restricted.

21 Claims, 11 Drawing Sheets

(51) Int. Cl.
  *G06V 40/16* (2022.01)
  *H04M 1/02* (2006.01)
  *H04M 1/72454* (2021.01)
(52) U.S. Cl.
  CPC ........ *G06V 40/161* (2022.01); *H04M 1/0264* (2013.01); *H04M 1/72454* (2021.01)
(58) Field of Classification Search
  CPC . H04M 1/0264; H04M 1/72454; G06F 3/011; G06F 3/017; G06F 3/013; G06V 40/161; G06V 40/193; H04N 23/45; H04N 23/611; H04N 23/62; H04N 23/63; H04N 23/631; H04N 23/634; H04N 23/635; H04N 23/667
  USPC ......................................................... 455/411
  See application file for complete search history.

(56) References Cited

U.S. PATENT DOCUMENTS

| 2014/0062931 | A1 | 3/2014 | Park |
| 2014/0218283 | A1 | 8/2014 | Choi et al. |
| 2016/0364091 | A1* | 12/2016 | Bernstein .............. G06F 3/0482 |
| 2018/0356904 | A1* | 12/2018 | Disano .................. G06F 3/0488 |
| 2020/0050416 | A1* | 2/2020 | Myung ............... G06F 3/04886 |
| 2020/0204738 | A1 | 6/2020 | Peng |
| 2020/0341546 | A1 | 10/2020 | Yuan et al. |
| 2020/0356140 | A1 | 11/2020 | Kim et al. |
| 2021/0096611 | A1 | 4/2021 | Schenone et al. |
| 2021/0105389 | A1 | 4/2021 | Ko et al. |
| 2022/0150345 | A1 | 5/2022 | Woo et al. |
| 2023/0044497 | A1* | 2/2023 | Zhang ................... G06F 3/1423 |
| 2023/0353862 | A1* | 11/2023 | Yi ........................ H04N 23/611 |
| 2025/0022211 | A1* | 1/2025 | Manzari ............. G06F 3/04847 |

FOREIGN PATENT DOCUMENTS

| KR | 10-2016-0076296 A | 6/2016 |
| KR | 10-1850035 B1 | 4/2018 |
| KR | 10-2019-0142290 A | 12/2019 |
| KR | 10-2020-0129584 A | 11/2020 |
| KR | 10-2021-0017282 A | 2/2021 |
| KR | 10-2211125 B1 | 2/2021 |
| KR | 10-2308201 B1 | 10/2021 |
| WO | 2017/135749 A1 | 8/2017 |

* cited by examiner

ELECTRONIC DEVICE INCLUDING MULTIPLE DISPLAYS AND METHOD FOR OPERATING THE SAME

CROSS-REFERENCE TO RELATED APPLICATION(S)

This application is a continuation application, claiming priority under § 365(c), of an International application No. PCT/KR2022/012698, filed on Aug. 25, 2022, which is based on and claims the benefit of a Korean patent application number 10-2021-0136066, filed on Oct. 13, 2021, in the Korean Intellectual Property Office, the disclosure of which is incorporated by reference herein in its entirety.

TECHNICAL FIELD

The disclosure relates to an electronic device including a plurality of displays and a method for operating the same.

BACKGROUND ART

There are being developed various applications executable on electronic devices to meet the demand of diverse users and to raise the utility of electronic devices. As an example, a camera application captures an image (e.g., a still image or a video) using a camera mounted on an electronic device. The user of the electronic device may capture an image using the camera application and provide various functions when capturing an image. In using various functions, it may be more convenient to use an electronic device providing a larger screen or a plurality of displays.

Since an electronic device including a plurality of displays is able to display the execution screen of the camera application through the plurality of displays, user convenience may be enhanced.

The above information is presented as background information only to assist with an understanding of the disclosure. No determination has been made, and no assertion is made, as to whether any of the above might be applicable as prior art with regard to the disclosure.

DISCLOSURE

Technical Problem

A subject (e.g., user) takes a selfie using the front camera while holding the electronic device. However, the user may ask a capturer to take a full body shot using the rear camera which provides advanced functions as compared with the front camera.

For example, the electronic device is able to display the execution screen of the camera application through each of the plurality of displays but, if operating in the same manner as an electronic device including a single display, it may have difficulty in properly using the advantages that comes from use of the plurality of displays. Accordingly, an execution screen of the camera application, which fits for the subject's intent, as well as the capturer's, is required, but there is no technique that provides a user interface for the subject to change (or edit) the camera settings during capture. For example, needed is a method that not only allows the capturer's manipulation but also allows the subject to change the camera settings while taking a shot in a position where the subject's hand hardly reaches the electronic device.

Aspects of the disclosure are to address at least the above-mentioned problems and/or disadvantages and to provide at least the advantages described below. Accordingly, an aspect of the disclosure is to provide an electronic device including a plurality of displays and a method for operating the same, which allow the subject, as well as the capturer, to change the camera settings during capture.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a camera module, a first display, a second display, and at least one processor. The at least one processor may be configured to display a first screen and a second screen for displaying at least one function of a camera application on the first display facing in a first direction and the second display facing in a second direction opposite to the first direction, respectively, wherein at least one of the first screen or the second screen includes an image obtained through the camera module, identify a first input for selecting a first function of the camera application through the first screen, identify a second input related to a subject's gaze or gesture in a state in which the first function of the camera application is selected through the first screen, and display, on the second screen, in a state in which the first function of the camera application is selected through the first screen, an indication that selection for the first function by the second input related to the subject's gaze or gesture is restricted.

In accordance with another aspect of the disclosure, a method for operating an electronic device including a plurality of displays is provided. The method includes displaying a first screen and a second screen for displaying at least one function of a camera application on a first display facing in a first direction and a second display facing in a second direction opposite to the first direction, respectively, wherein at least one of the first screen or the second screen includes an image obtained through a camera module, identifying a first input for selecting a first function of the camera application through the first screen, identifying a second input related to the subject's gaze or gesture in a state in which the first function of the camera application is selected through the first screen, and displaying, on the second screen, in a state in which the first function of the camera application is selected on the first screen, an indication indicating that selection for the first function by the second input related to the subject's gaze or gesture is restricted.

Advantageous Effects

According to various embodiments, not only the capturer but also the subject may change (or edit) the camera settings through each of the plurality of displays. Thus, it is possible to provide an execution screen of the camera application that fits for the intent of the capturer and subject. Accordingly, it is possible to take a photo which gives high satisfaction to both the capturer and the subject.

According to various embodiments, the subject may also change the camera settings using his gaze or gesture while performing manipulation despite capturing in a position where the subject's hand hardly reaches the electronic device.

According to various embodiments, it is possible to prevent conflict while changing the settings by sharing changes to the camera settings by the capturer and the subject.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
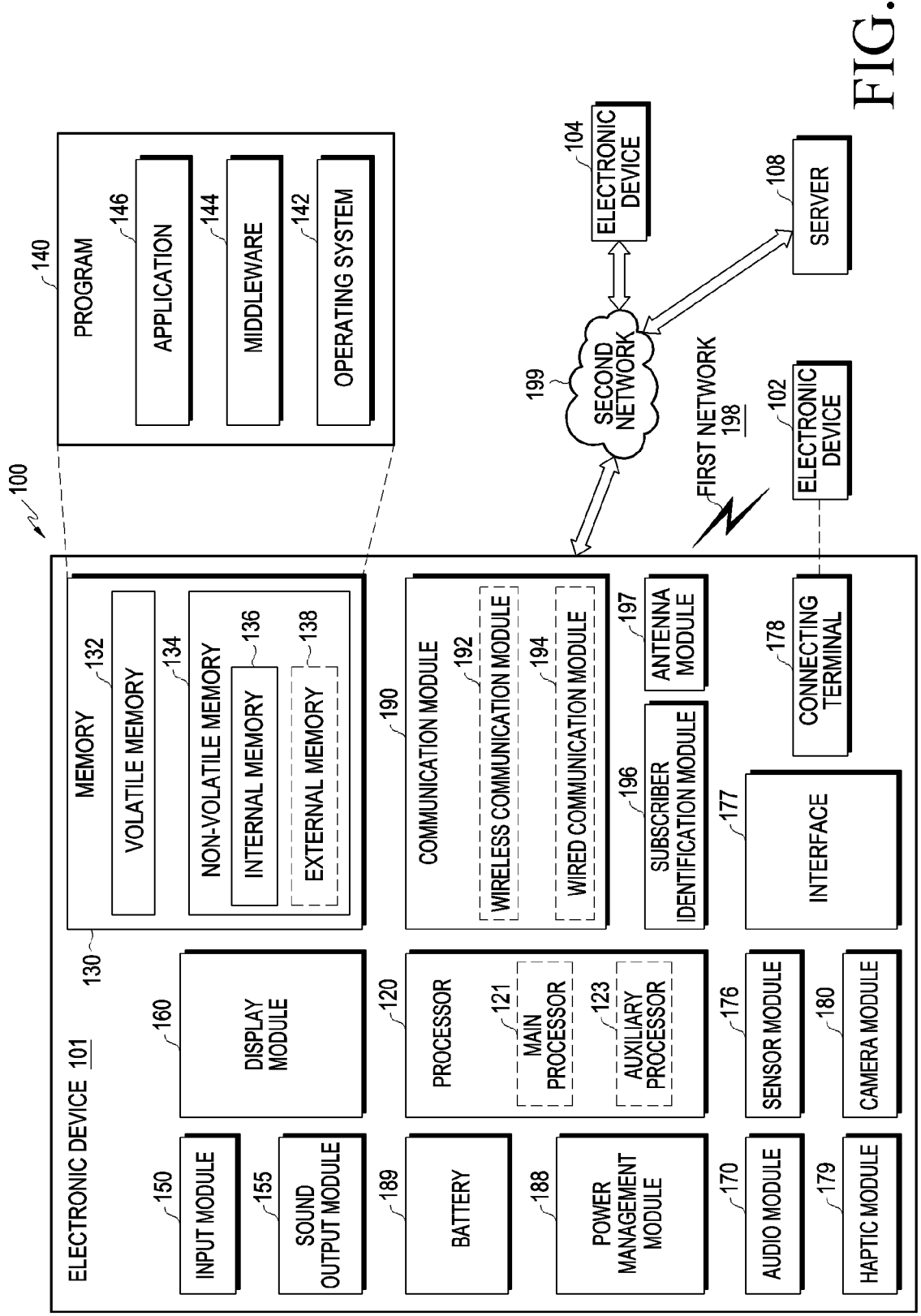
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
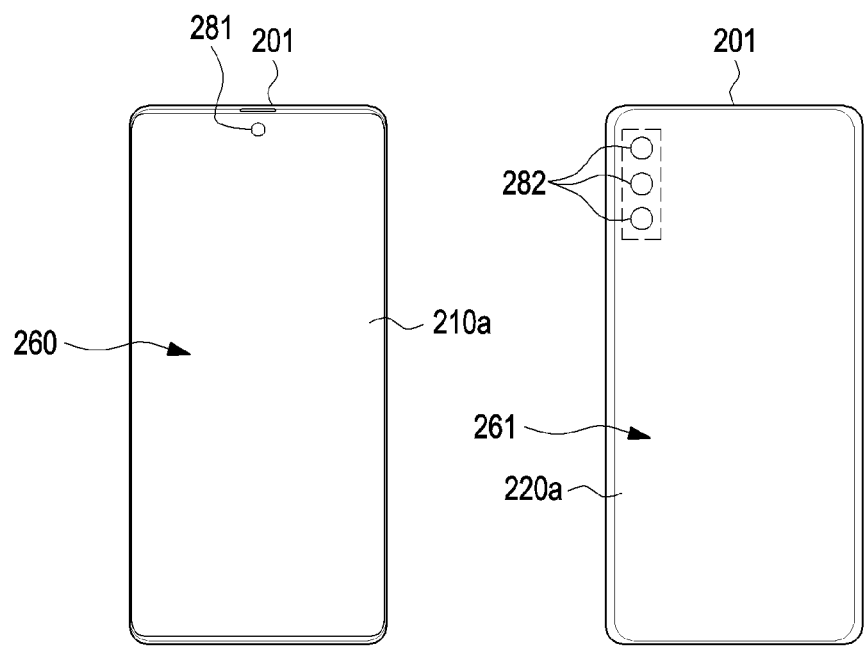
FIG. 2 is a view illustrating an example of an electronic device according to an embodiment of the disclosure.

FIG. 2 is a view illustrating an example of an electronic device according to an embodiment of the disclosure.

Referring to FIG. 2, according to various embodiments, an electronic device 201 may include a plurality of displays (e.g., a first display 260 and a second display 261), and a sensor area may be provided in each of a first surface 210*a* and a second surface 220*a* of the housing. At least one sensor may be disposed in the sensor area. The at least one sensor may include at least one of, e.g., a camera, a receiver, an illuminance sensor, or a proximity sensor. The placement, shape, and size of the sensor area are not limited to the shown example. The sensor area may be formed to have a predetermined area, adjacent to one corner of each of the first surface 210*a* and the second surface 220*a* of the housing. In an embodiment, the at least one sensor may be exposed to the front surface of the electronic device 201 through one or more openings prepared in the sensor area.

According to an embodiment, as shown in FIG. 2, the first display 260 may be disposed so that the display panel is exposed to the first surface (e.g., front surface) 210*a* of the housing of the electronic device 201, and the second display 261 may be disposed on the second surface (e.g., rear surface) 220*a*. Further, cameras (e.g., a front camera 281 and a rear camera 282) included in the camera module (e.g., the camera module 180 of FIG. 1) may be configured to be disposed in a portion of the first surface 210*a* and a portion of the second surface 220*a* of the housing, respectively.

In the following detailed description, the first surface 210*a* where the first display 260 is disposed is defined as a front surface of the electronic device 201, and the second surface 220*a* facing in the direction opposite to the first surface is defined as a rear surface of the electronic device 201. As shown in FIG. 2, the sensor exposed through the sensor area of the first surface 210*a* of the electronic device 201 may include the front camera 281, and the sensor exposed through the sensor area of the second surface 220*a* of the electronic device 201 may include the rear camera 282. Here, the first display 260 disposed on the front surface may be referred to as a front display or main display, and the second display 261 disposed on the rear surface may be referred to as a rear display, sub display, or cover display.

Figure 3:
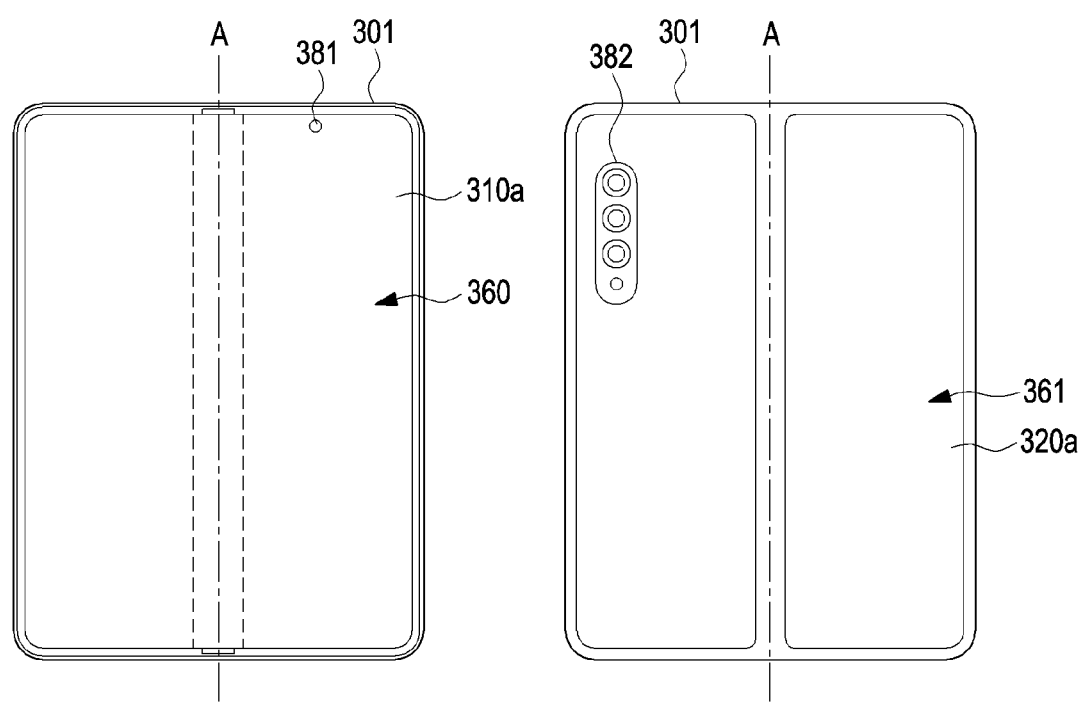
FIG. 3 is a view illustrating another example of an electronic device according to an embodiment of the disclosure.

FIG. 3 is a view illustrating another example of an electronic device according to an embodiment of the disclosure.

Referring to FIG. 3, in an embodiment, an electronic device 301 may include a foldable housing and a flexible or foldable display disposed in a space formed by the foldable housing. The foldable housing may have a substantially symmetrical shape about a folding axis (e.g., axis A). According to an embodiment, the surface where the flexible display is disposed may be defined as a first surface 310*a* of the electronic device 301, and the surface opposite to the first surface 310*a* may be defined as a second surface 320*a*. According to an embodiment, a front camera 381 may be provided on the first surface 310*a* of the electronic device 301, and a rear camera 382 may be provided on the second surface 320*a*.

As shown in FIG. 3, a first display 360 of the flexible display may be formed to occupy the entire first surface 310*a* of the electronic device 301, and a second display 361 of the flexible display may be formed to occupy at least a portion of the second surface 320*a*. In this case, the first display 360 may pivot through a separate hinge module, and the second display 361 may be fixed to the housing.

For example, the second display 361 may be disposed on any one of a pair of housings disposed on two opposite sides with respect to a folding axis (e.g., axis A). According to an embodiment, the first display 360 may mean a flexible display at least a portion of which may be transformed into a flat or curved surface. The first display 360 may include a first area disposed on one side of the folding axis (e.g., axis A) and a second area disposed on the opposite side of the folding axis.

For example, when the electronic device 301 is in an unfolded state (e.g., a flat state), the surface of the first area and the surface of the second area may form 180 degrees therebetween and face in the same direction (e.g., the forward direction of the electronic device 301). When the electronic device 301 is in a folded state, the surface of the first area and the surface of the second area of the first display 360 may face each other while forming a narrow angle (e.g., an angle between 0 and 10 degrees) therebetween. According to an embodiment, in the folded state of the electronic device 301, the second display 361 may be disposed on any one of the pair of housings disposed on two opposite sides of the folding axis (e.g., axis A), but this is an example, and the second display 361 may configure most of the rear surface 320 depending on the structure or function. For example, the electronic device 301 may include the second display 361 at least a portion of which is visually exposed through the rear cover. Accordingly, it should be noted that the size and shape of the first display 360 and the second display 361 are not limited thereto. For example, the electronic device 301 may include three or more displays. First display and second display according to an embodiment described below may mean two displays facing in a first direction and a direction opposite to the first direction among the three or more displays.

Figure 4:
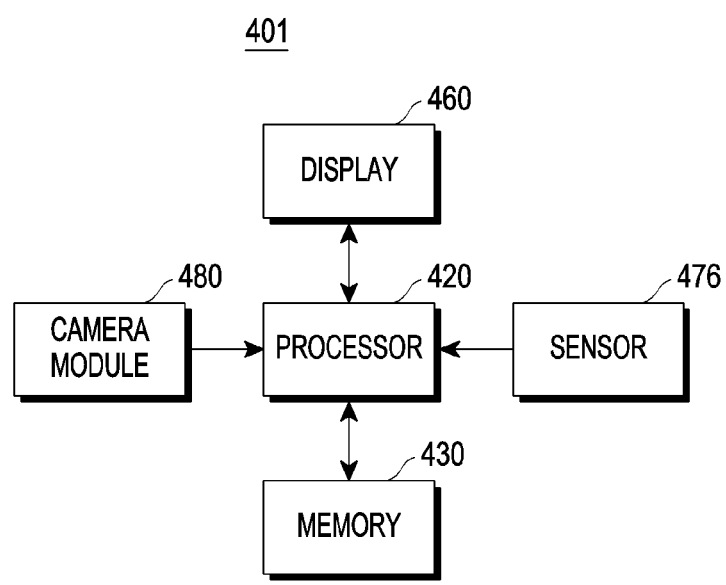
FIG. 4 is a block diagram illustrating an internal configuration of an electronic device according to an embodiment of the disclosure.

FIG. 4 is a block diagram illustrating an internal configuration of an electronic device according to an embodiment of the disclosure. The operations of the electronic device are described in detail with reference to FIG. 5.

Figure 5:
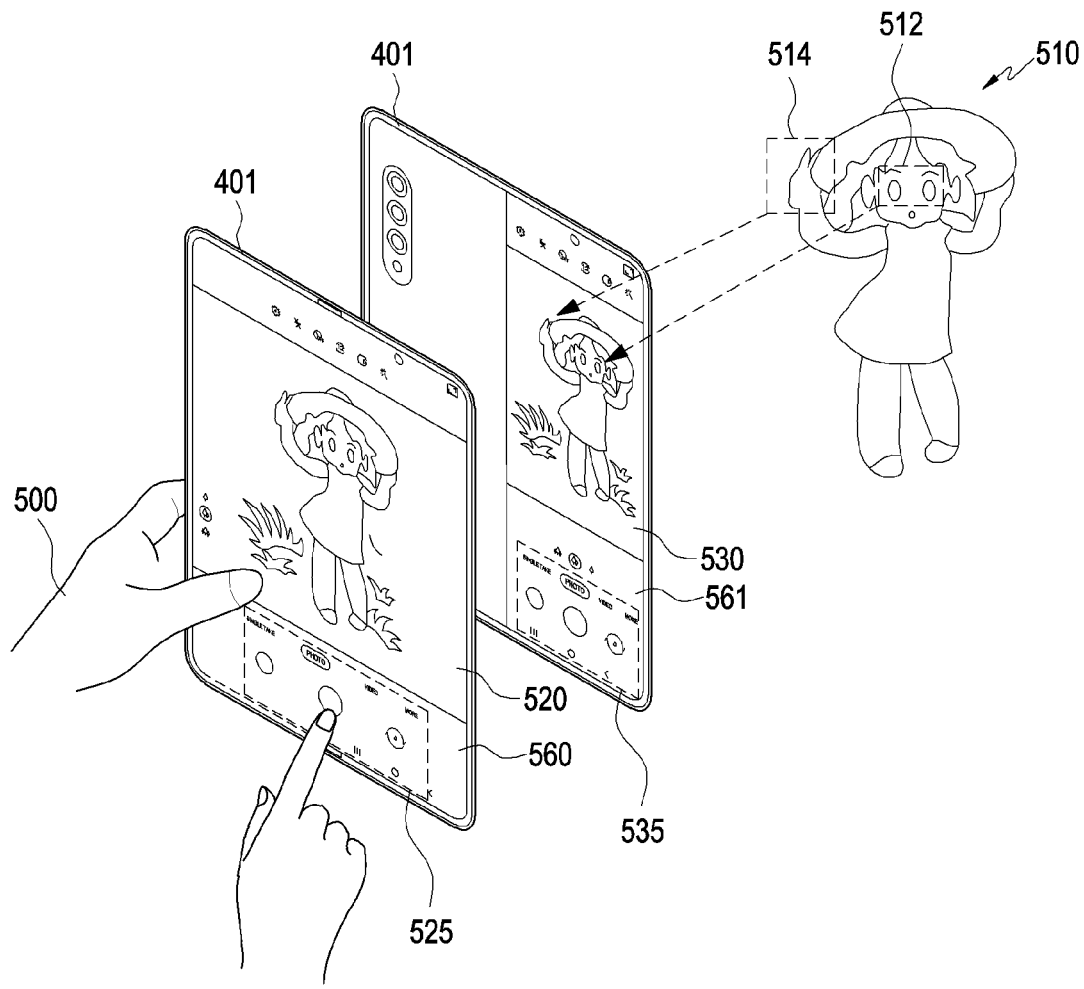
FIG. 5 is a view illustrating an example for describing a capture operation using a front/rear display in an unfolded state according to an embodiment of the disclosure.

FIG. 5 is a view illustrating an example for describing a capture operation using a front/rear display in an unfolded state according to an embodiment of the disclosure.

Referring to FIG. 4, an electronic device 401 may include at least one processor 420, a memory 430, a display 460, a sensor 476, and a camera module 480.

According to an embodiment, the display 460 may include a plurality of displays (e.g., two or more). Referring to FIG. 5, a first display 560 may be disposed on the first surface (e.g., front surface) (e.g., 210*a* of FIG. 2 or 310*a* of FIG. 3) of the electronic device 401 to face in a first direction, and a second display 561 may be disposed on the second surface (e.g., rear surface) (e.g., 220*a* of FIG. 2 or 320*a* of FIG. 3) to face in a second direction opposite to the first direction in the unfolded state.

According to an embodiment, the sensor 476 may include at least one sensor for sensing a gesture of a user (e.g., a subject). Here, the gesture of the subject may mean a hand gesture of the subject to be captured. Sensing data from the sensor 476 may be transferred to the at least one processor 420, and the sensing data may be processed by the at least one processor 420.

According to an embodiment, the sensor 476 may be any one of an infrared sensor, an ultrasonic sensor, a motion sensor, a 3D sensor, and a vision sensor, but the type of the sensor is not limited thereto. Information sensed by at least two of the sensors may be combined and used to detect the user's hand gesture. For example, the at least one processor 420 may detect the user's hand gesture based on the output from the ultrasonic sensor and the camera.

According to an embodiment, the camera module 480 may include a plurality (e.g., two) of cameras having different attributes or functions. In such a case, at least one of the plurality of cameras may form, for example, a wide-angle camera and at least another of the plurality of cameras may form a telephoto camera. Similarly, at least one of the plurality of cameras may form, for example, a front camera and at least another of the plurality of cameras may form a rear camera. For example, the first camera may be disposed on the first surface of the electronic device 401, and the second camera may be disposed on the second surface. The first camera and the second camera may include an image sensor, and the image sensor may convert the light emitted or reflected and transferred from the subject into an electrical signal, thereby obtaining an image corresponding to the subject.

According to an embodiment, the memory 430 may store information necessary to perform the operations of selecting and changing the camera settings by bidirectional interaction while displaying a preview image using the plurality of displays and may include one or more modules for performing part of the operations of selecting and changing the camera settings by the bidirectional interaction. For example, the memory 430 may at least temporarily store at least some of the images obtained through the camera module 480, for the next image processing task.

According to an embodiment, the at least one processor 420 (e.g., the processor 120 of FIG. 1) may control the memory 430, the display 460, at least one sensor (e.g., the sensor 476), and camera module 480 connected to the at least one processor 420 and perform various data processing or computations.

The at least one processor 420 may perform control so that the camera module 480 is driven if a camera application (e.g., program or function) for image capture is executed. The at least one processor 420 may identify the presence of an image capture request, e.g., when receiving an input by an execution icon (e.g., an object, a graphic element, a menu, a button, or a shortcut image) representing the camera application displayed on the home screen (not shown) of the display 460, a designated button input, or a designated gesture input and execute the camera application.

The at least one processor 420 may control the camera module 480 including at least one camera to activate at least one camera to execute image capture as the camera application is executed and control the display 460 to display an image capture screen (or preview screen). The at least one processor 420 may display, on the display 460, at least one image frame obtained through the camera module 480 (e.g., image sensor). For example, the display 460 may display the preview image captured through the rear camera (e.g., the rear camera 282 of FIG. 2 or the rear camera 382 of FIG. 3) facing the subject. The preview image means an image displayed in realtime on the display 460 when at least one subject (e.g., a person) is captured using the camera module 480 of the electronic device 401. For example, at least one image frame obtained through the image sensor of the camera module 480 may be the preview image.

The at least one processor 420 controlling the plurality of displays may allow the content output on the first display 560 included in the display 460 to be displayed on the second display 561 by switching or allow the content to be displayed on both the first display 560 and the second display 561 in realtime. For example, if a mode is set to allow bidirectional interaction by a capturer 500 and a subject 510, the preview image may be rendered to be displayed in realtime on each of the first display 560 and the second display 561. Accordingly, the capturer 500 of the electronic device 401 may easily capture an external subject through the preview image, and the subject 510 may grasp the capturing context and perform capture manipulation through the preview image.

According to an embodiment, the at least one processor 420 may provide a function to allow the subject 510 or the capturer 500 to change the camera settings while capturing an image. For example, the at least one processor 420 may control the rear camera included in the camera module 480 to be driven to capture the subject. The at least one processor 420 may display the preview for the image of the subject received in realtime from the rear camera on each of the first display 560 and the second display 561 included in the display 460.

As shown in FIG. 5, the first display 560 may be a display exposed in the first direction to the capturer 500, and the second display 561 may be a display exposed in the second direction, which is opposite to the first direction, to the subject 510. The first display 560 and the second display 561 may display a first screen 520 and a second screen 530 for displaying at least one function of the camera application, wherein at least one of the first screen or the second screen includes the image of the subject obtained through the camera module 480. Here, the first screen 520 and the second screen 530 may be the same preview screen for the subject. For example, the preview screen itself displayed on the first screen 520 and the second screen 530 may differ depending on the size or set scheme of the display, but the same preview screen may mean a preview screen where the image captured for the same subject is displayed.

According to an embodiment, if an option is set for entry into a bidirectional interaction mode to allow for manipulation by the subject 510 as well as by the capturer 500 upon executing the camera application, the at least one processor 420 may display the preview screen for the subject on each of the first display 560 and the second display 561, allowing the capturer 500 and the subject 510 to share the same screen. The at least one processor 420 may control the first display 560 and the second display 561 to display the first screen 520 and the second screen 530, respectively, which include objects (e.g., options, menu, graphic elements, functions, or shortcut icons) 525 and 535 related to the camera settings, along with the image of the subject during image capture.

According to an embodiment, the at least one processor 420 may select and change the objects related to the camera settings displayed on the first display 560 based on an input (e.g., touch input) from the capturer 500 through the first display 560 during image recording and reflect the matters related to the selection and change and display them on the second screen 530 as well as on the first screen 520.

According to an embodiment, the at least one processor 420 may select and change the objects related to the camera settings displayed on the second display 561 based on an input (e.g., a gaze 512 or gesture 514 of the subject 510) from the subject 510. Accordingly, the subject 510 may also change the camera settings while allowing the capturer 500 to perform manipulation during capture in a position where a hand of the subject 510 hardly reaches the electronic device 401. As shown in FIG. 5, the subject 510 himself may change the camera settings using the gaze 512 or gesture 514 of the subject 510 during capture.

According to an embodiment, the at least one processor 420 may identify a gesture (e.g., gesture type) based on the data sensed by at least one sensor included in the sensor 476 and select and perform at least one function of the camera application corresponding to the gesture. Further, the at least one processor 420 may detect the subject's hand gesture based on the image of the subject obtained by the camera module 480. Alternatively, the at least one processor 420 may combine information sensed by the sensor 476 and the camera module 480 and use the combined information for detecting the subject's hand gesture. According to another embodiment, the at least one processor 420 may detect the subject's gaze, other than the subject's hand gesture, based on the image of the subject obtained by the camera module 480 and perform the function corresponding to the direction of the detected gaze.

For example, the at least one processor 420 may change (or edit) the camera settings (or attributes) based on at least one input related to the gaze 512 or gesture 514 of the subject 510. Further, the at least one processor 420 may perform a control operation on the screen of the camera application that is currently being executed based on an input from the subject 510.

According to an embodiment, the at least one processor 420 may perform face detection on each of a plurality of input images, e.g., image frames, obtained through the camera module 480. It is possible to find an invariant face feature (face element, such as eyes, nose, or mouth, texture, or skin color) by a feature-based face detection method. For example, a face template-based face detection method or a support vector machine (SVM)-based face detection method or such face information detection methods may be used.

The at least one processor 420 may identify at least one subject candidate group by detecting a face from the input image and display an area indicating the subject candidate group, thereby leading to selection for any one subject.

The at least one processor 420 may analyze the area corresponding to the selected subject and extract the direction of gaze of the detected face. For example, the at least one processor 420 may estimate a position on the second display 561 which the subject's gaze faces. As a method for extracting the gaze direction, a method related to gaze detection may be used. For example, eye tracking or head tracking may be used, and the gaze detection method may not be limited thereto.

It is possible to extract the gaze direction of the subject included in the input image by detecting the gaze direction and identify whether the subject gazes at the front surface (or center of the screen) or side surface (or side surface of the screen) in the second screen 530. Thus, it is possible to select and change the camera application using the gaze direction. For example, in estimating the position on the second display 561 which the subject's gaze faces, the at least one processor 420 may calculate the distance between the estimated position and each object related to the camera settings in the second screen 530 and select the object positioned closest to the estimated position. For example, if the distance between the gaze and the selected object in relation to the camera settings is within 10% of the longer axis of the frame, the subject may be regarded as having gazed at the object.

Further, the at least one processor 420 may detect the hand shape when detecting the subject's hand gesture based on the image of the subject obtained by the camera module 480 and extract the direction in which the subject points. The at least one processor 420 may select the object positioned closest to the direction in which the hand shape points. For example, when the difference in direction is within 5 degrees, the corresponding object may be regarded as having been selected.

As described above, the at least one processor 420 may map a function selectable in the second screen 530 in response to an input (e.g., the gaze 512 or gesture 514 of the subject 510) from the subject 510 and identify and perform the mapped function.

For example, the second screen 530 facing the subject 510 may include various objects (or menu, icons, or items) in relation to the camera settings, and each object may include information configured to be easily matched with the operation of the subject. For example, each piece of object information may include a gesture configured to match the direction or corresponding function with respect to the position coordinates and the center of the image frame.

Meanwhile, since selection and change for the camera settings may be performed by the capturer 500 and the subject 510, if an input by the capturer 500 and an input by the subject 510 for the same function are simultaneously received, a conflict may occur.

According to an embodiment, in a state in which a first function of the camera application is selected by the capturer 500 on the first screen 520, the at least one processor 420 may display, on the second screen 530, a restriction on the selection for the first function by an input (e.g., the gaze 512 or gesture 514 of the subject 510) of the subject 510.

Upon detecting an input (e.g., the gaze 512 or gesture 514 of the subject 510) from the subject 510 while displaying the first screen 520 and the second screen 530, the at least one processor 420 may identify the second function corresponding to the detected input among at least one function of the camera application and execute the second function. Here, at least one function of the camera application may include components (or objects, menu, icons) for controlling the camera settings during capture.

Meanwhile, according to an embodiment, to prevent misrecognition of the input from the subject 510 that may occur when the subject blinks or makes a meaningless hand gesture, the at least one processor 420 may execute the second function corresponding to the input from the subject 510 when a predetermined condition is met based on the degree (e.g., input duration, number of inputs) of the input from the subject 510.

According to an embodiment, the at least one processor 420 may identify whether the input from the subject 510 lasts a predetermined time and, if the input lasts the predetermined time, perform the second function. Alternatively, if a designated number of, or more, inputs are continuously detected from the subject 510, the at least one processor 420 may perform the second function corresponding to the input from the subject 510. For example, while the second function is running, the at least one processor 420 may display a restriction on selection for the second function on the first screen 520 to prevent duplicate input by the capturer 500. For example, the at least one processor 420 may display the graphic object indicating the second function among the graphic objects respectively indicating at least one function of the camera application displayed on the first screen 520, in the disabled state, to be restricted for selection.

In contrast, the at least one processor 420 may also display the graphic objects respectively indicating at least one function of the camera application, on the second screen 530, like on the first screen 520. According to an embodiment, the at least one processor 420 may change at least one of the color effect, color, or saturation of the graphic object to indicate selection of the graphic object indicating the second function in response to the input from the subject 510. For example, it is possible to effectively notify the user of the state of selection by the subject 510 by changing at least one of the color effect, color, or saturation of the graphic object and displaying it.

Further, the at least one processor 420 may set the graphic object indicating the second function to change its visual effect based on the degree of input (e.g., input duration or number of inputs) from the subject 510. For example, the subject 510 may represent changes in the selection state by changing the graphic object, such as the color or saturation of the graphic object, based on the elapse of the input duration from the subject 510. For example, the changes in the visual effect of the graphic object may play a role to allow the subject 510 to maintain the selection until before selection of the subject 510 by the input is executed. Accordingly, if the graphic object is fully filled in the color, the function of the camera application corresponding to the graphic object may immediately be executed.

As such, the subject 510 may share the second screen 530 which is the same as the first screen 520 being viewed by the capturer 500, and selection and changes to the camera settings in the first screen 520 may be applied, as is, to the second screen 530 and output, and selection and changes to the camera settings in the second screen 530 may also be applied, as is, to the first screen 520 and output. Accordingly, the subject 510 and the capturer 500 may share the selection and changes to the camera settings, and the subject 510 may change the camera settings actively as he desires.

According to various embodiments, the electronic device 401 may comprise the camera module 480, the first display 560, the second display 561, and the at least one processor 420. The at least one processor 420 may be configured to display a first screen and a second screen for displaying at least one function of a camera application on the first display 560 facing in a first direction and the second display 561 facing in a second direction opposite to the first direction, respectively, wherein at least one of the first screen or the second screen includes an image obtained through the camera module, identify a first input for selecting a first function of the camera application through the first screen, identify a second input related to a subject's gaze or gesture in a state in which the first function of the camera application is selected through the first screen, and display, on the second screen, in a state in which the first function of the camera application is selected on the first screen, an indication indicating that selection for the first function by the second input related to the subject's gaze or gesture is restricted.

According to various embodiments, the at least one processor may be configured to identify a third input related to the subject's gaze or gesture for selecting a second function of the camera application, and execute the second function corresponding to the third input related to the subject's gaze or gesture.

According to various embodiments, the at least one processor may be configured to identify a third input related to the subject's gaze or gesture for selecting a second function of the camera application, identify whether the third input continues a predetermined time, and execute the second function corresponding to the third input, in response to the third input continuing the predetermined time.

According to various embodiments, the at least one processor may be configured to display, on the first screen, an indication that selection for the second function is restricted, while executing the second function corresponding to the third input related to the subject's gaze or gesture.

According to various embodiments, the at least one processor may be configured to display graphic objects respectively indicating the at least one function of the camera application on at least a portion of the second screen, and in response to identifying the third input related to the subject's gaze or gesture, display an indication that a graphic object corresponding to the third input among the graphic objects is selected.

According to various embodiments, the at least one processor may be configured to change a visual effect of the graphic object corresponding to the third input according to duration of the third input.

According to various embodiments, the at least one processor may be configured to change at least one of a color effect, color, or saturation of the graphic object, in association with selection for the graphic object corresponding to the third input.

According to various embodiments, the at least one processor may be configured to display, on the second screen, the indication that selection for the first function is restricted by changing at least one of the color effect, color, or saturation of the graphic object corresponding to the third input in a state in which the first function of the camera application is selected through the first screen.

According to various embodiments, the at least one processor is configured to display, on the first screen and the second screen, a same image for the subject in a preview form.

According to various embodiments, the electronic device 401 may further comprise at least one sensor (e.g., the sensor 476). The at least one processor may be configured to identify a gesture of the subject by the at least one sensor, and select the at least one function of the camera application corresponding to the gesture.

According to various embodiments, the at least one processor may be configured to perform face detection on the image of the subject obtained by the camera module, and extract a gaze direction of the detected face to select the at least one function of the camera application corresponding to the gaze direction.

Figure 6:
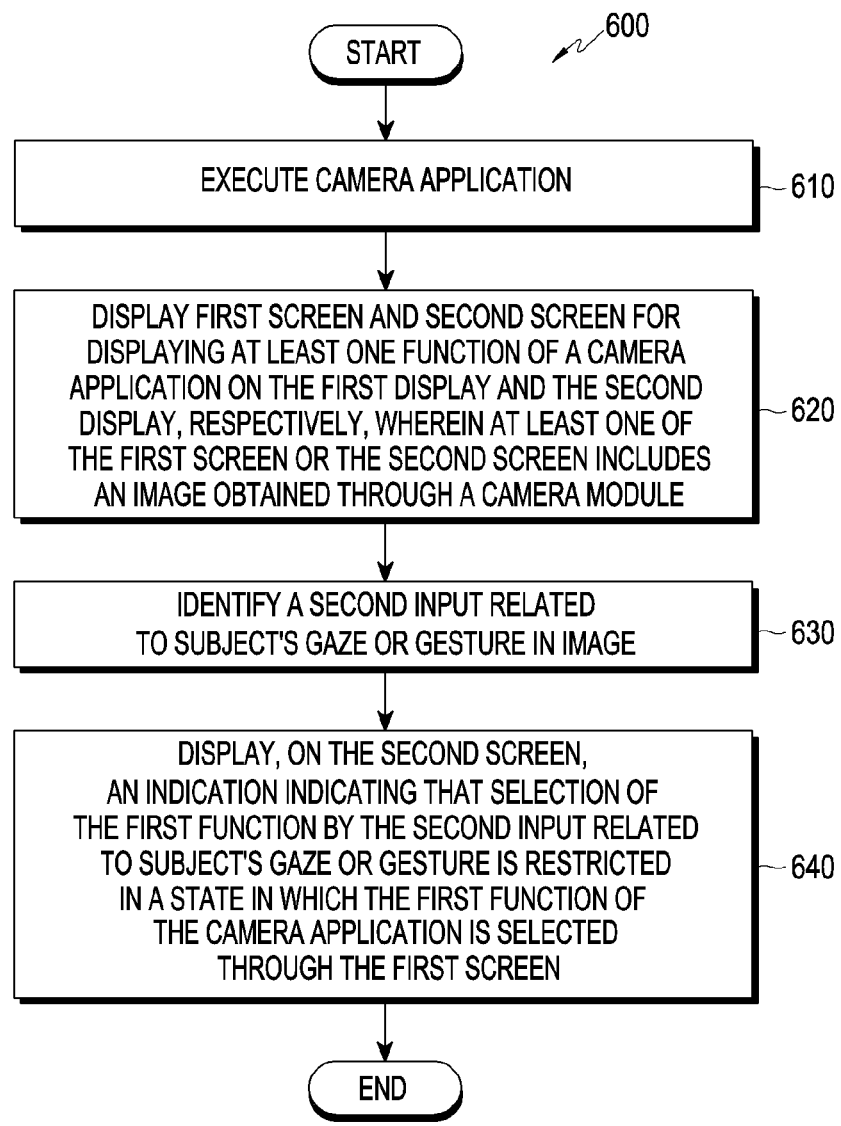
FIG. 6 is a flowchart illustrating operations of an electronic device according to an embodiment of the disclosure.

FIG. 6 is a flowchart illustrating operations of an electronic device according to an embodiment of the disclosure.

Referring to FIG. 6, an operation method of flowchart 600 may include operations 610, 620, 630, and 640. Each operation of the operation method of FIG. 6 may be performed by an electronic device (e.g., the electronic device 101 of FIG. 1, the electronic device 201 of FIG. 2, the electronic device 301, or the electronic device 401 of FIG. 4) or at least one processor (e.g., at least one of the processor 120 of FIG. 1 or the at least one processor 420 of FIG. 4) of the electronic device.

In operation 610, the electronic device 401 may execute a camera application. For example, the electronic device 401 may identify the presence of an image capture request when receiving an input by an execution icon (e.g., an object, a graphic element, a menu, a button, or a shortcut image) representing the camera application displayed on the screen, a designated button input, or a designated gesture input and execute the camera application.

In operation 620, when the camera application is executed, the electronic device 401 may display a first screen and a second screen for displaying at least one function of the camera application on the first display 560 and the second display 561, respectively, wherein at least one of the first screen or the second screen includes an image obtained through a camera module. For example, the first screen and the second screen may be screens that display the same image for a subject in the form of a preview, and the electronic device 401 may display a preview screen including objects (e.g., options, menu, graphic elements, functions, or shortcut icons) indicating at least one function of the camera application upon capture. According to an embodiment, according to a user setting, the preview screen displayed on the first display 560 may be rendered to be displayed on both the first display 560 and the second display 561.

According to an embodiment, the electronic device 401 may identify a first input for selecting a first function of the camera application through the first screen.

In operation 630, in a state in which the first function of the camera application is selected through the first screen, the electronic device 401 may identify a second input related to the subject's gaze or gesture in the image. According to an embodiment, the electronic device 401 may identify the subject's gesture by at least one sensor and select at least one function of the camera application corresponding to the gesture. According to another embodiment, the electronic device 401 may perform face detection on the image of the subject obtained by the camera module, extract the gaze direction of the detected face, and select at least one function of the camera application corresponding to the gaze direction.

In operation 640, the electronic device 401 may display, on the second screen, an indication indicating that selection of the first function by the second input related to the subject's gaze or gesture is restricted in a state in which the first function of the camera application is selected through the first screen. As such, it is possible to prevent conflict while changing the settings by sharing changes to the camera settings through both the screens by the capturer and the subject.

According to an embodiment, the electronic device 401 may identify a third input related to the subject's gaze or gesture for selecting a second function of the camera application and execute the second function corresponding to the third input. For example, the electronic device 401 may identify the function indicated by the input of the subject among the functions of the camera application displayed on the second screen facing the subject and execute the corresponding function. Accordingly, the subject may also change the camera settings using his gaze or gesture while performing manipulation despite capturing in a position where the subject's hand hardly reaches the electronic device 401.

According to an embodiment, the operation of executing the second function corresponding to the third input related to the subject's gaze or gesture may include the operation of identifying a third input related to the subject's gaze or gesture for selecting a second function of the camera application, the operation of identifying whether the third input lasts a predetermined time and the operation of executing the second function corresponding to the third input in response to the third input lasting the predetermined time. For example, it is possible to prevent misrecognition of the subject's input which may occur when the subject blinks or makes a meaningless hand gesture by identifying the degree of input (e.g., duration or number of inputs) of the subject and then executing the corresponding function when a predetermined condition is met.

According to an embodiment, the electronic device 401 may display graphic objects respectively indicating at least one function of the camera application on at least a portion of the second screen and, in response to identifying the third input related to the subject's gaze or gesture, display an indication that a graphic object corresponding to the third input among the graphic objects is selected.

According to an embodiment, the operation of displaying the indication that the graphic object corresponding to the third input is selected may include the operation of changing the visual effect of the graphic object corresponding to the third input according to the duration of the third input.

According to an embodiment, the operation of displaying the indication that the graphic object corresponding to the third input is selected may include the operation of changing at least one of the color effect, color, or saturation of the graphic object in association with selection of the graphic object corresponding to the third input.

According to an embodiment, the operation of the displaying of the indication indicating that selection of the first function by the second input related to the subject's gaze or gesture is restricted comprises displaying, on the second screen, a graphic object in a disabled state.

According to an embodiment, wherein the displaying of the graphic object in the disabled state comprises changing at least one of a color effect, a color, or saturation of the graphic object.

According to an embodiment, the electronic device 401 may output a conflict message based on inputs being received on both the first screen and the second screen before displaying the graphic object in the disabled state.

Figure 7:
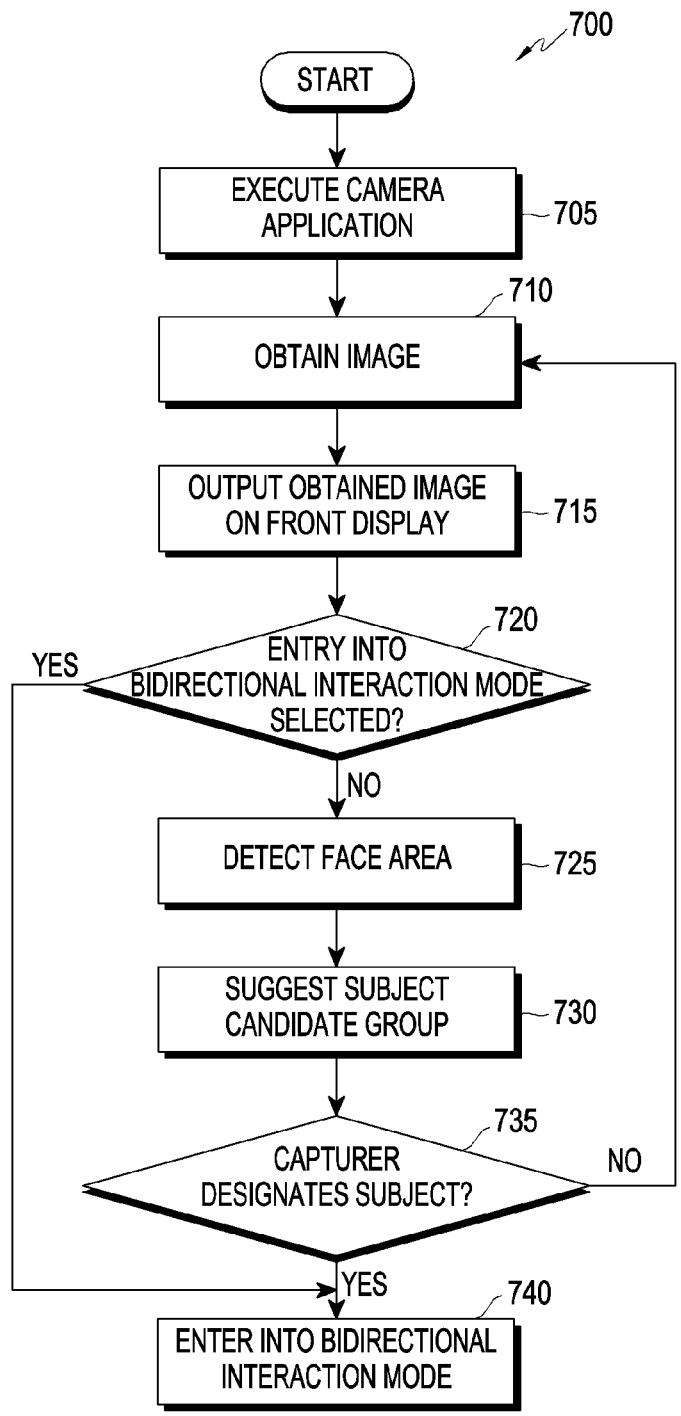
FIG. 7 is a flowchart illustrating operations for entry into a bidirectional interaction mode according to an embodiment of the disclosure.

FIG. 7 is a flowchart illustrating operations for entry into a bidirectional interaction mode according to an embodiment of the disclosure. The operations of an electronic device are described in detail with reference to FIG. 8.

Figure 8:
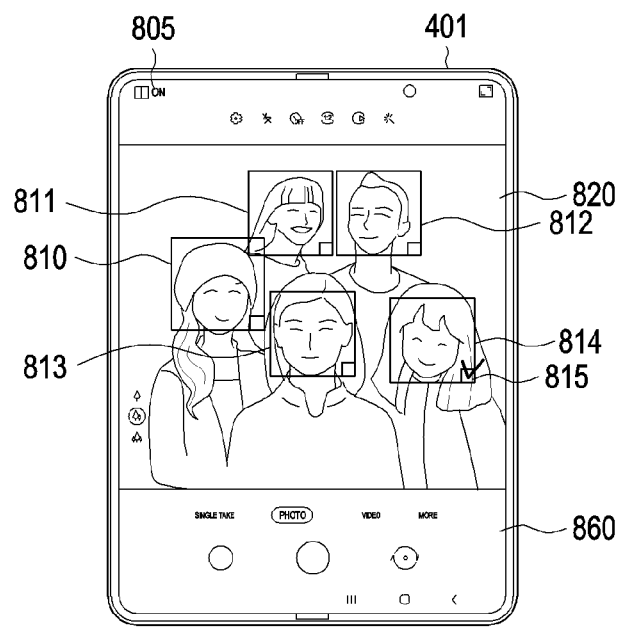
FIG. 8 is a view illustrating a screen example for determining a subject according to an embodiment of the disclosure.

FIG. 8 is a view illustrating a screen example for determining a subject according to an embodiment of the disclosure.

Referring to FIG. 7, an operation method of flowchart 700 may include, if the camera application is executed, in operation 705, the electronic device 401 may obtain an image and output the obtained image in the form of a preview, in operation 710. In operation 715, the electronic device 401 may output the obtained image on the front display.

Referring to FIG. 8, when the electronic device 401 captures a plurality of subjects using the rear camera, the electronic device 401 may display a preview screen 820 for the image of the plurality of subjects on a first display 860.

In operation 720, the electronic device 401 may identify whether entry into the bidirectional interaction mode is selected. According to an embodiment, a switch into the bidirectional interaction mode may be made according to selection by the capturer (or the user of the electronic device 401) while obtaining and displaying an image with the camera application executed.

In response to selection of entry into the bidirectional interaction mode, the electronic device 401 may enter into the bidirectional interaction mode, in operation 740. For example, when a selection for using the bidirectional interaction mode is input when the camera application is executed, the electronic device 401 may immediately enter into a mode in which the camera may be manipulated bidirectionally by the capturer and the subject figure during capture. Whether the bidirectional interaction mode is entered may be determined according to initial camera settings or, alternatively, according to selection on the menu for entry into the bidirectional interaction mode when the camera application is executed. Meanwhile, the bidirectional interaction mode may be used in various modes, such as a photo mode, a video mode, a single take, portrait mode, professional mode, or night mode, and any other mode for capturing a figure on camera is applicable.

For example, as shown in FIG. 8, a menu (or button) 805 for entry into the bidirectional interaction mode which is the mode for displaying the preview screen on both the first display 560 and the second display 561 may be displayed on the preview screen. Accordingly, if selection on the menu is input, the electronic device 401 may enter into the bidirectional interaction mode. For example, a menu for entering into the bidirectional interaction mode may be selected by the capturer or may also be selected by the subject.

Meanwhile, when a target permitted for camera manipulation during capture is designated although entry into the bidirectional interaction mode is not set according to the initial camera settings or the menu for entry into the bidirectional interaction mode is not selected, the electronic device 401 may automatically enter into the bidirectional interaction mode. For example, when there are a plurality of subjects although the bidirectional interaction mode is used, it is needed to determine whose input among several subject figures except for the capturer is to be used as the input for camera manipulation because the subject disclosed herein is a person. In an embodiment, the subject may be set to be designated by the capturer.

Specifically, according to an embodiment, in operation 720, in a state in which entry into the bidirectional interaction mode is not selected, the electronic device 401 may perform operation 725 to allow the capturer to designate any one subject. Since the subject is assumed to be a person, the electronic device 401 may detect the face area from the image obtained, in operation 725, and suggest detected face areas as a subject candidate group, in operation 730. As shown in FIG. 8, guide boxes 810, 811, 812, 813, and 814 may be displayed to indicate subject candidate groups. The guide boxes 810, 811, 812, 813, and 814 may be areas including the respective faces of the subject figures. The capturer may designate one subject by selecting an object (e.g., via a check box 815) for selecting the subject in the guide box.

Meanwhile, although such an example has been described where areas including the faces of the subject figures are determined through face area detection on the entire preview image, it is possible to suggest, as the subject candidate group, the face area detected by designating a portion of the preview image, i.e., a specific area of the preview image by the capturer, and then performing face area detection on the designated subject area. Further, after performing face detection on the entire preview image and then designating the largest area among the detected face areas as a subject candidate group, the face area corresponding to the subject candidate group may be tracked.

As described above, the electronic device 401 may display the preview screen including the subject candidate group on the first display 560 and the second display 561 to be identified by both the capturer and the subject. For example, although a subject area is designated by the capturer, the preview screen including the subject candidate group including another, non-designated subject face, may be continuously displayed on the first display 560. Thus, although the subject is mis-designated, the capturer may change it to another subject of the subject candidate group. According to an embodiment, to prevent such an occasion where several subject figures simultaneously try to change the camera settings, the capturer may designate one subject at a time. According to another embodiment, the capturer may set priority by, e.g., sequential touch inputs, rather than using the check box 815, to allow camera manipulation by the subject with higher priority when the capturer designates several subjects.

As described above, the capturer may designate any one among the plurality of subjects through the preview screen 820. Accordingly, in operation 735, the electronic device 401 may identify whether a subject is designated by the capturer. In operation 740, in response to identifying designation of the subject, the electronic device 401 may enter into the bidirectional interaction mode. For example, after entering into the bidirectional interaction mode, camera manipulation by the designated subject may be possible. As such, entry into the bidirectional interaction mode may be possible by using the menu 805 for entry into the bidirectional interaction mode or designating a subject for which camera manipulation is allowed by the capturer during capture.

Figure 9:
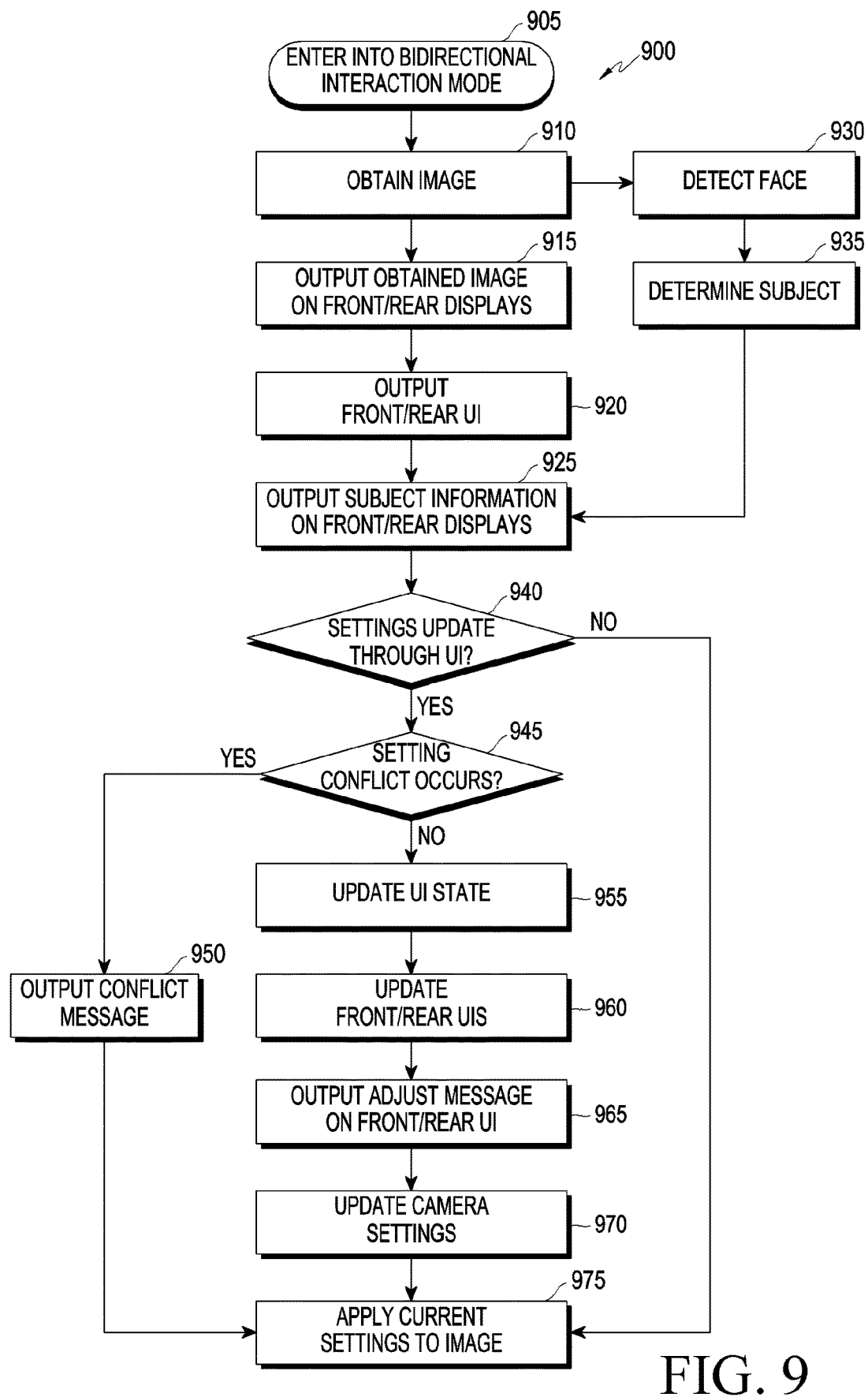
FIG. 9 is a flowchart illustrating operations in a bidirectional interaction mode according to an embodiment of the disclosure.

FIG. 9 is a flowchart illustrating operations in a bidirectional interaction mode according to an embodiment of the disclosure. According to an embodiment, at least one of operations of the flowchart of FIG. 9 may be omitted, some operations thereof may be performed in reverse order, or other operations may be added thereto.

Referring to FIG. 9, an operation method of flowchart 900 may include, upon entering into the bidirectional interaction mode, in operation 905, the electronic device 401 may obtain an image, in operation 910. For example, although an example of obtaining an image for at least one subject upon entering into the bidirectional interaction mode is described in connection with FIG. 9, the electronic device 401 may obtain an image for the subject upon executing the camera application and enter into the bidirectional interaction mode according to the capturer's selection while obtaining the image as shown in FIG. 7. In such a case, when entering into the bidirectional interaction mode, the image may be already in the middle of being obtained.

In operation 915, the electronic device 401 may output the obtained image on the front/rear displays. For example, the obtained image may be output in the form of a preview. Subsequently, in operation 920, the electronic device 401 may output each of the front/rear user interfaces (UIs) including the obtained image and objects for camera settings. Here, each of the front/rear UIs may include objects (or components, menus, and icons) (e.g., the objects 525 and 535 of FIG. 5) for controlling the camera settings during capture. For example, the electronic device 401 may display an execution screen of the camera application on both the displays upon entering into the bidirectional interaction mode if the camera application is executed. The rear UI may differ from the front UI in the shape and arrangement of components for controlling the camera settings to facilitate setting the camera by a subject input.

According to an embodiment, the electronic device 401 may perform face detection on the image obtained, in operation 930, for subject configuration in the background while displaying the UI including the image obtained in operation 910 on the front/rear displays and then determine a subject, in operation 935. For example, in determining a subject, the capturer may designate any one of the subject candidate group obtained through the face detection operation on the entire image (hereinafter, subject image) or, alternatively, the largest area among the detected face areas may be suggested as a subject candidate group to allow designation by the capturer.

In operation 925, the electronic device 401 may output subject information on the front/rear displays in response to subject determination, in operation 935. For example, the electronic device 401 may preview the image for the subject designated by the capturer on the preview screen. Accordingly, the subject may share the same preview screen as the preview screen being viewed by the capturer, and the capturer or the subject may share selections and changes to the camera settings as well.

In operation 940, the electronic device 401 may identify whether an update for the settings through the UI is required according to manipulation by the capturer or by an input by the subject (e.g., the subject's gaze or gesture). For example, when an input for adjusting the camera settings is received through any one of the two UIs, the electronic device 401 may identify the state of the other UI than that where the input has been received. Here, the UI state shows the setting item selected and being currently adjusted by the capturer or the subject and may include various items related to the camera settings. As shown in FIG. 5, examples of the items related to the camera settings may include various items (e.g., the objects 525 and 535) adjustable while the camera application is running, such as filter type or screen ratio.

In operation 945, the electronic device 401 may identify whether a setting conflict occurs. For example, the electronic device 401 may identify whether a setting conflict occurs between the setting item corresponding to the input by the subject and the other UI state. If the setting item corresponding to the input by the subject is already selected and used by the capturer on the other side, a setting conflict may occur. Accordingly, when the setting conflict occurs, the electronic device 401 may cancel the input by the subject, and then output a conflict message, in operation 950, and proceed to operation 975.

According to an embodiment, to prevent a conflict between input by the subject and input by the capturer, a corresponding item may be disabled to restrict item selection for camera manipulation on any one UE. Thus, a conflict may be prevented. However, a conflict may occur if inputs are received on both the sides before the corresponding item is disabled in response to input to any one side. In such a case, a conflict message may be output, notifying both the sides of the conflict.

In contrast, when no setting conflict occurs, the electronic device 401 may update the UI state, in operation 955, and may perform a front/rear UI update, in operation 960. For example, in the case of input by the subject, the electronic device 401 may select the setting item indicated by the subject input on the rear UI and then reflect the setting state corresponding to the selection, thereby updating the front/rear UIs.

Then, the electronic device 401 may output an adjust message on the front/rear UIs, in operation 965, update the camera settings, in operation 970, and apply the current settings to the obtained image (e.g., subject image), in operation 975. Accordingly, the setting item indicated by the subject input on the front UI may be disabled to be limited for selection to prevent conflict with the subject input, and a message may be output which indicates what settings are in progress by the subject input. For example, when the capturer is changing the beauty settings on the front UI, the corresponding item may be disabled to prevent entry into the beauty settings on the rear UI, and at the same time, a message indicating that the beauty settings are being changed may be output on the front UI.

Accordingly, the electronic device 401 may update the camera settings to correspond to the changed settings and apply the changed items to the obtained image, thereby displaying the changed subject image on both the displays. It is possible to take a photo which gives high satisfaction to both the capturer and the subject by identifying such subject image.

Figure 10:
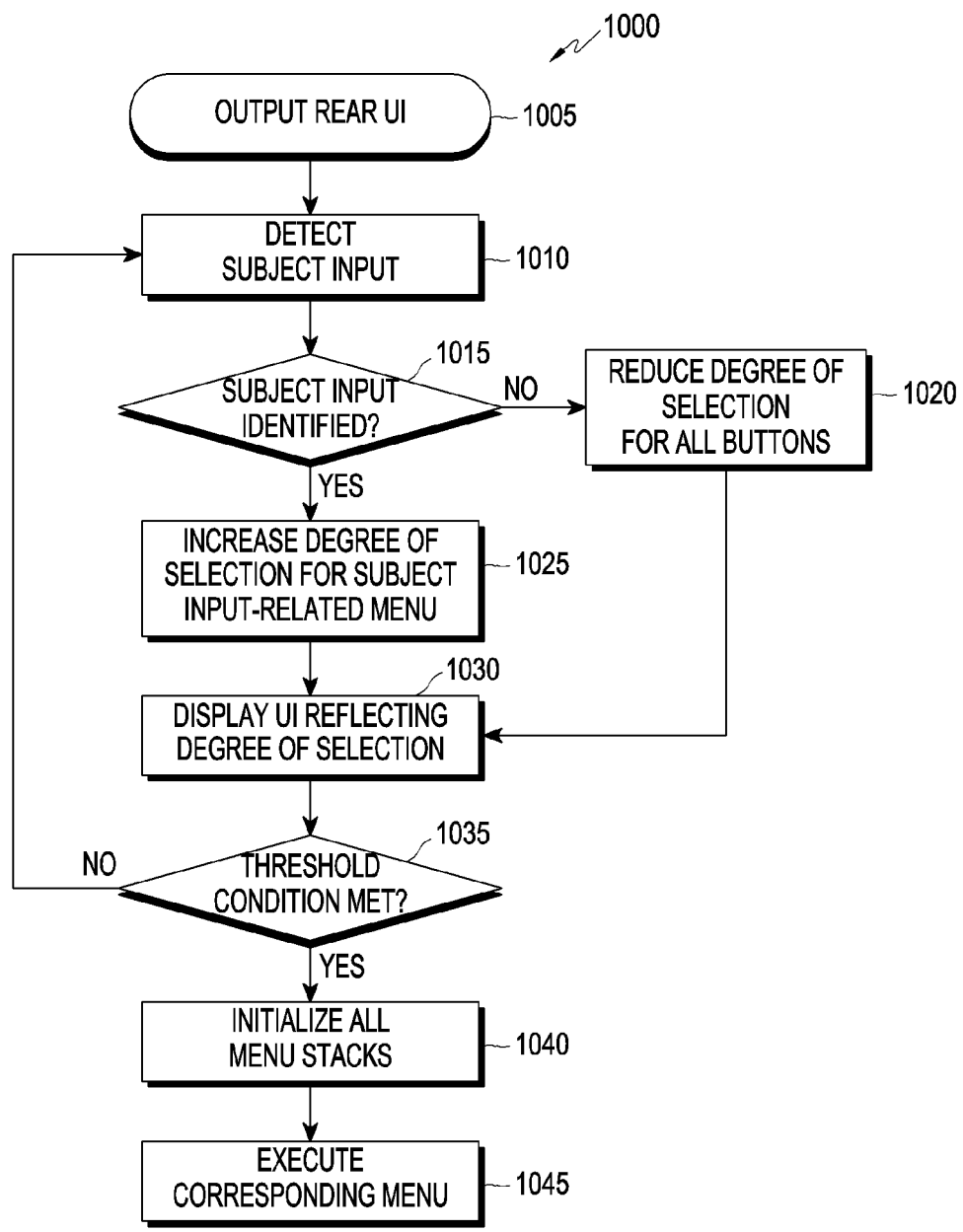
FIG. 10 is a flowchart illustrating operations according to a subject's interaction according to an embodiment of the disclosure.

FIG. 10 is a flowchart illustrating operations according to a subject's interaction according to an embodiment of the disclosure. This is described below in detail with reference to FIG. 11.

Figure 11:
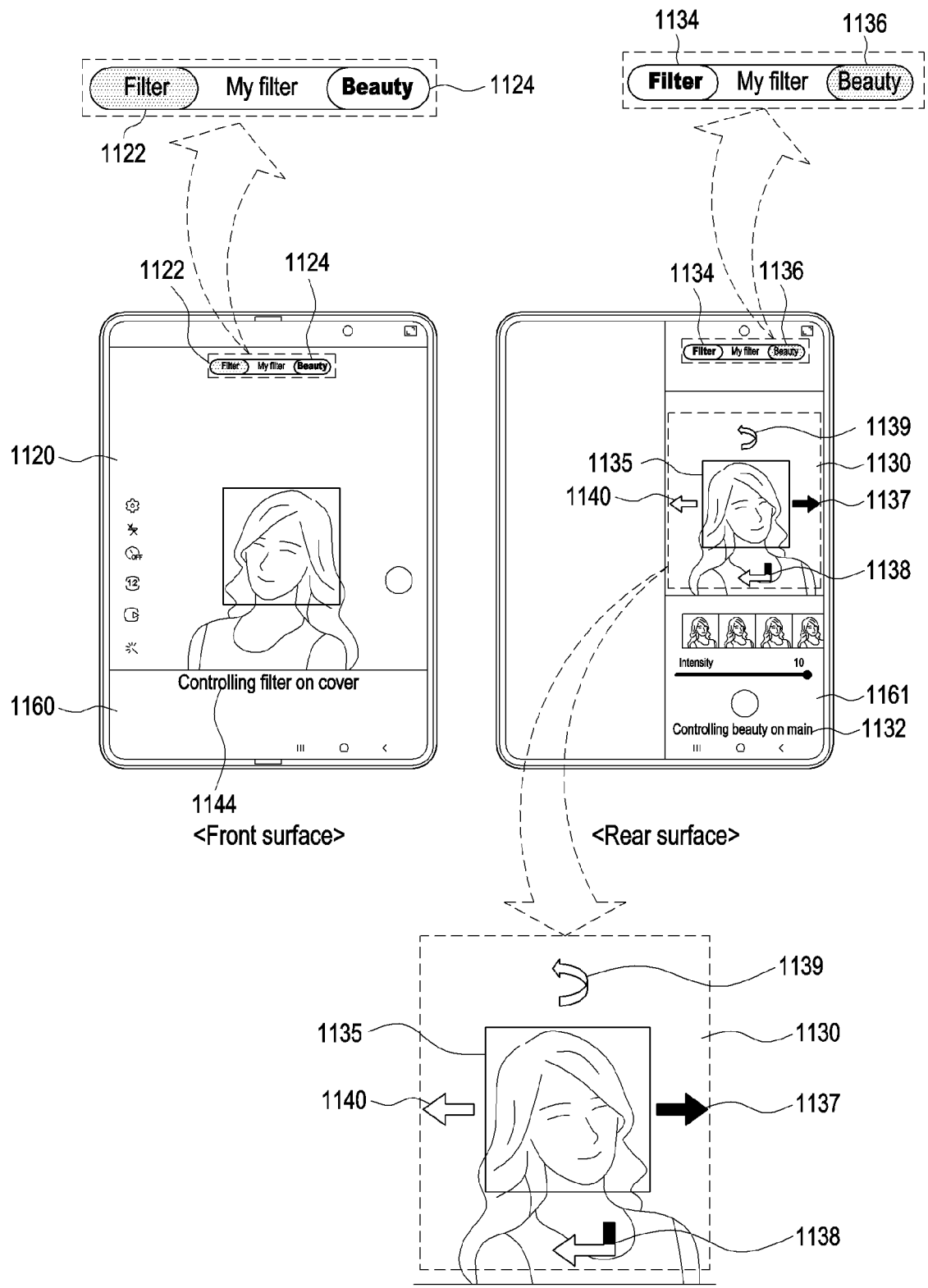
FIG. 11 is a view illustrating an example of a user interface displayed on a front/rear display in a bidirectional interaction mode according to an embodiment of the disclosure.

FIG. 11 is a view illustrating an example of a user interface displayed on a front/rear display in a bidirectional interaction mode according to an embodiment of the disclosure.

FIG. 10 is a flowchart illustrating detailed operations corresponding to interaction intended by a subject through the rear UI. On the front UI, the capturer may select a desired item using a touch input. However, capture through the rear camera is mostly performed at a distance where touch input by the subject is difficult. Thus, input on the rear UI may require interaction in a fashion other than touch input by the subject. According to an embodiment, input on the rear UI may be at least one input related to the subject's gaze or gesture.

Referring to FIG. 10, an operation method of flowchart 1000 may include the electronic device 401 outputting the rear UI, in operation 1005. Referring to FIG. 11, a rear UI 1130 displayed on a rear display 1161 may include a plurality of objects (e.g., buttons, icons, or menus) (e.g., filter menu 1134, beauty menu 1136, right arrow 1137, and down arrow 1138) related to the camera settings, along with a preview image for the subject. For example, a front UI 1120 displayed on a first display 1160 may also include objects related to the camera settings, which are changeable by the capturer while displaying the preview image for the subject.

According to an embodiment, the electronic device 401 may detect a subject input, in operation 1010, while outputting the rear UI and identify the subject input, in operation 1015.

According to an embodiment, the electronic device 401 may detect a gaze or gesture in the image for the subject and identify the direction in which the detected gaze or gesture points. If the subject input is identified, the electronic device 401 may increase the degree of selection for the subject input-related menu, in operation 1025. For example, when the direction indicated by the subject input related to the gaze or gesture is identified, the menu positioned in the direction indicated by the subject input may be selected. For example, the operation of detecting the direction indicated by the gaze or the direction indicated by the gesture may have an error. An error may occur due to an external factor. An image frame facing an unintended object (e.g., a button) may be obtained while the subject turns his gaze as an object attracting attention instantly appears. Accordingly, if the button is determined to be selected to reduce influence by such an error, the electronic device 401 may control to execute the function corresponding to the subject input by continuously selecting the button, rather than immediately executing the function. To that end, a scheme of accruing recent selections may be put to use. For example, the degree of selection which indicates the accrual of selections may mean the duration during which the selection by the subject input lasts or the number of selections.

According to an embodiment, the electronic device 401 may detect a gaze or gesture every image frame obtained through the rear camera. Thus, the electronic device may identify how many times the corresponding gaze or gesture is detected among, e.g., 60 frames. As such, since the electronic device 401 detects the gaze or gesture on a per-image frame basis, the electronic device 401 may regard detection of the subject's gaze or gesture continuously for a predetermined time or longer or a predetermined number of times or more, as corresponding to the degree of selection (or the number of selections).

In operation 1030, the electronic device 401 may display a UI reflecting the degree of selection. As the selection proceeds, the electronic device 401 may identify whether the degree of selection meets a threshold condition, in operation 1035. For example, when the duration of the selection by the subject input is a threshold time or longer or when the number of selections is a threshold number or more, the electronic device 401 may initialize all menu stacks, in operation 1040, and then execute the menu corresponding to the subject input, in operation 1045. For example, each button related to the camera settings may have a variable related to the recent number of selections and, whenever the corresponding button is selected, the variable value may increase. When the subject gaze or gesture is simultaneously detected, the electronic device 401 may increase the number of selections of the corresponding button for all subject inputs detected. If the accrued variable value reaches a threshold, the electronic device 401 may execute the function of the button for which the threshold is reached and initialize all the menu stacks not to affect the next operation, i.e., initialize the numbers of selections for all the buttons.

In contrast, when the degree of selection does not meet the threshold condition, the electronic device 401 may return to operation 1010 and, when the subject input is not identified, e.g., when a subject input for camera settings is not received, the electronic device 401 may reduce the degree of selection for all the buttons, in operation 1020. Accordingly, the electronic device 401 may display a UI reflecting the reduction in the degree of selection, in operation 1030.

For example, when the subject input is not identified, e.g., when a motion by the subject is not detected, it is highly likely that the subject does not desire more settings, and the recent number of selections (or variable value) may be adjusted. For example, adjustment of the number of selections may also be influenced by a mistake in the motion of the subject due to an external factor or a detection failure error. Accordingly, to prevent too frequent initialization of the number of button selections, the electronic device 401 may reduce the number of selections, rather than initializing the number of selections, whenever the subject input is identified. In such a case, the variable value to be reduced every image frame may be set to be equal to the amount which is increased every frame when a motion is detected.

As described above, the electronic device 401 is based on continuous motions over a few frames, rather than executing the function of immediately reacting to the subject's motion, so that the subject may identify whether his intended motion is properly reflected.

To that end, the components for the camera settings displayed on the front UI and the components for the camera settings displayed on the rear UI may differ in shape and arrangement as compared with the components for controlling the camera settings on the front UI to allow the subject to identify the camera settings by the subject input at a glance and easily although their numbers of items are the same.

As in the rear UI 1130 in FIG. 11, the degree of selection for each button may be shown using graphic elements in response to the subject input. As the degree of selection is so displayed for each button, the subject may maintain the current motion (e.g., gaze or gesture) and immediately stop the motion when misdetection occurs.

FIG. 11 illustrates an example in which the capturer sets a beauty menu 1124 on the first display 1160, and the subject sets the filter menu 1134 on the rear display 1161. For example, a preview image for the subject making settings on the rear display 1161 may be output on both the front UI 1120 and the rear UI 1130.

According to an embodiment, in a state in which a first function of the camera application is selected by the capturer on a first screen (e.g., the front UI 1120), the electronic device 401 may display, on a second screen (e.g., the rear UI 1130), restriction on selection for the first function by a designated subject input (e.g., the subject's gaze or gesture). According to an embodiment, the object indicating the first function may be displayed as disabled. For example, although there is the subject's input for selecting the object displayed as disabled, the electronic device 401 may perform no operation in response to the subject input.

For example, when the beauty menu has been selected by the capturer, and the filter menu has been selected by the subject, the beauty menu 1124 selected by the capturer may be displayed as a selectable active state, and a filter menu 1122 selected by the subject may be displayed as an inactive state that cannot be selected by the capturer, on the front UI 1120. In contrast, on the rear UI 1130, the filter menu 1134 may be displayed as the selectable active state, and the beauty menu 1136 may be displayed as the inactive state that cannot be selected by the subject. As such, the capturer who performs capture while gazing at the front UI 1120 may be aware that the menu, which he selected and is using, is a beauty menu through the enabled beauty menu 1124 and may recognize that the filter menu 1122 has already been selected by the subject and is thus impossible to select by the capturer through the disabled filter menu 1122.

Likewise, the subject who manipulates the camera settings while gazing at the rear UI 1130 may be aware that the menu, which he selected and is using, is a filter menu through the enabled filter menu 1134 and may recognize that the beauty menu has been selected by the capturer and is thus impossible to select by the subject through the disabled beauty menu 1136.

According to an embodiment, when the capturer selects the beauty menu 1124 on the front UI 1120, the electronic device 401 may identify whether the beauty menu 1136 has been selected on the rear UI 1130. If the beauty menu 1136 has already been selected on the rear UI 1130, the electronic device 401 may cancel the capturer's selection on the front UI 1120 while displaying a cancel-related message on the front UI 1120. On the other hand, if the beauty menu 1136 has not been selected on the rear UI 1130, the electronic device 401 may permit entry into the beauty menu 1124 on the front UI 1120 and disable the beauty menu 1136 on the rear UI 1130 while simultaneously outputting, on the rear UI 1130, a message (e.g., 'controlling beauty on main') 1132 indicating that beauty is being set on the front UI 1120. For example, it is possible to indicate the disabled state by changing at least one of the color effect, color, or saturation of the object corresponding to the beauty menu 1136.

For example, if the variable values for the beauty menu 1136 are accrued based on the subject input on the rear UI 1130, the electronic device 401 may initialize the corresponding variable value. By so doing, it is possible to prevent simultaneous entry into the same menu by the capturer and the subject and hence a conflict. However, upon simultaneous entry into the same menu, the side who first selected may be prioritized.

Further, even when the filter menu 1134 is selected by the subject on the rear UI 1130, a message (e.g., 'controlling filter on cover') 1144 indicating that the filter is being set on the rear UI 1130 may be output on the front UI 1120 in a similar manner to what has been described above.

According to an embodiment, the rear UI 1130 may further include auxiliary buttons (e.g., the right arrow 1137, down arrow 1138, previous menu (up arrow 1139), and an increase value/index (left arrow 1140)) in an intuitive form to facilitate selection and changes to the camera settings by the gaze or gesture of the subject who is a predetermined distance or more away. For example, the rear UI 1130 includes example auxiliary buttons, such as the previous menu (up arrow 1139), the increase value/index (left arrow 1140), a decrease value/index (right arrow 1137), and a down to sub menu (down arrow 1138). Accordingly, the electronic device 401 may identify which auxiliary button the subject's gaze or gesture indicates to thereby change and display the graphic element for the button intended by the subject, so that the subject may perceive the context of selection.

An example of setting the type of the filter by the subject on the rear UI 1130 is described. A box 1135 covering the face area of the subject may indicate the type of the filter. If the subject input is identified as indicating the up arrow 1139, the electronic device 401 may return to the previous menu, i.e., filter/my filter/beauty selection. In contrast, if the subject input is identified as indicating the down arrow 1138, the electronic device 401 may enter into the filter intensity adjust menu which is the sub menu. Further, if the subject input is identified as indicating the left arrow 1140, the electronic device 401 may select the previous filter and, if it is identified as indicating the right arrow 1137, select the next filter.

According to an embodiment, the electronic device 401 may display the degree of selection for the subject input in such a manner as to fill the arrow area. As such, the arrow area may be filled or partially filled as the subject input continues. If the arrow area is fully filled as the input continues, it may be identified that the threshold for performing the function indicated by the arrow is reached. In contrast, the arrows 1139 and 1140 which are not selected by the subject input may be displayed with the areas of the arrows 1139 and 1140 empty.

Meanwhile, shown is an example in which on the rear UI 1130, the area of the down arrow 1138 is partially filled, which may be one intended by the subject or may indicate an occurrence due to misrecognition. In contrast, the area of the right arrow 1137 may be gradually filled as the subject input continues. If the area of the right arrow 1137 is fully filled, the electronic device 401 may perform the operation corresponding to the right arrow 1137, e.g., the operation of applying the next filter. For example, all of the areas of the arrows 1137, 1138, 1139, and 1140 may be emptied while the next filter is simultaneously applied. In the above-described manner, the changes on the rear UI 1130 may be reflected and displayed on the front UI 1120 as well, and the electronic device 401 may display the next filter-applied preview image on both the front UI 1120 and the rear UI 1130.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   camera circuitry;
   a first display;
   a second display;
   memory storing one or more computer programs; and
   one or more processors communicatively coupled to the camera circuitry, the first display, the second display, and the memory,
   wherein the one or more computer programs include computer-executable instructions that, when executed by the one or more processors individually or collectively, cause the electronic device to:
   display a first screen on the first display facing a first direction, and
   display a second screen on the second display facing a second direction opposite to the first direction, the first screen and the second screen displaying at least one function of a camera application, the first screen and the second screen including an image obtained through the camera circuitry,
   identify, through the first screen, a first input for selecting a first function of the camera application,
   after the identifying of the first input, identify a second input for selecting the first function, the second input being related to a subject's gaze or gesture in the image for selecting the first function and identified in a state in which the first function of the camera application is selected through the first screen, and
   display, on the second screen in the state in which the first function of the camera application is selected through the first screen, an indication indicating that selection of the first function by the second input related to the subject's gaze or gesture is restricted.

2. The electronic device of claim 1, wherein the one or more computer programs further include computer-executable instructions that, when executed by the one or more processors individually or collectively, cause the electronic device to:
   identify a third input related to the subject's gaze or gesture for selecting a second function of the camera application, and
   execute the second function corresponding to the third input.

3. The electronic device of claim 1, wherein the one or more computer programs further include computer-executable instructions that, when executed by the one or more processors individually or collectively, cause the electronic device to:
   identify a third input related to the subject's gaze or gesture for selecting a second function of the camera application,
   identify that the third input continues for a predetermined amount of time, and
   in response to the third input continuing for the predetermined amount of time, execute the second function corresponding to the third input.

4. The electronic device of claim 3, wherein the one or more computer programs further include computer-executable instructions that, when executed by the one or more processors individually or collectively, cause the electronic device to:
   display, on the first screen, an indication indicating that selection of the second function is restricted while executing the second function corresponding to the third input.

5. The electronic device of claim 3, wherein the one or more computer programs further include computer-executable instructions that, when executed by the one or more processors individually or collectively, cause the electronic device to:
   display graphic objects on at least a portion of the second screen, the graphic objects indicating the at least one function of the camera application, respectively, and
   in response to identifying the third input, display an indication indicating that a graphic object corresponding to the third input is selected among the graphic objects.

6. The electronic device of claim 5, wherein the one or more computer programs further include computer-executable instructions that, when executed by the one or more processors individually or collectively, cause the electronic device to:
   change a visual effect of the graphic object corresponding to the third input based on a duration of time of the third input.

7. The electronic device of claim 5, wherein the one or more computer programs further include computer-executable instructions that, when executed by the one or more processors individually or collectively, cause the electronic device to:
   change at least one of a color effect, a color, or saturation of the graphic object based on a selection of the graphic object corresponding to the third input.

8. The electronic device of claim 7, wherein the one or more computer programs further include computer-executable instructions that, when executed by the one or more processors individually or collectively, cause the electronic device to:
   display, on the second screen, the indication indicating that selection of the first function is restricted by changing at least one of the color effect, the color, or the saturation of the graphic object corresponding to the third input in the state in which the first function of the camera application is selected through the first screen.

9. The electronic device of claim 1, wherein the one or more computer programs further include computer-executable instructions that, when executed by the one or more processors individually or collectively, cause the electronic device to:
   display, on the first screen and the second screen, a same image for the subject in a preview form.

10. The electronic device of claim 1, further comprising:
    at least one sensor,
    wherein the one or more computer programs further include computer-executable instructions that, when executed by the one or more processors individually or collectively, cause the electronic device to:
    identify, using the at least one sensor, a gesture of the subject, and
    select a function corresponding to the gesture from among the at least one function of the camera application.

11. The electronic device of claim 1, wherein the one or more computer programs further include computer-executable instructions that, when executed by the one or more processors individually or collectively, cause the electronic device to:
   perform face detection to detect a face on the image of the subject obtained by the camera circuitry, and
   extract a gaze direction of the detected face to select a function corresponding to the gaze direction from among the at least one function of the camera application.

12. The electronic device of claim 1, wherein the first screen and the second screen include the image obtained through the camera circuitry and graphic objects indicating the at least one function of the camera application, respectively.

13. A method performed by an electronic device including a plurality of displays, the method comprising:
   displaying, by the electronic device, a first screen on a first display facing a first direction;
   displaying, by the electronic device, a second screen on a second display facing a second direction opposite to the first direction, the first screen and the second screen displaying at least one function of a camera application, the first screen and the second screen including an image obtained through camera circuitry of the electronic device;
   identifying, by the electronic device through the first screen, a first input selecting a first function of the camera application;
   after the identifying of the first input, identifying, by the electronic device, a second input for selecting the first function, the second input being related to a subject's gaze or gesture in the image for selecting the first function and identified in a state in which the first function of the camera application is selected through the first screen; and
   displaying, by the electronic device on the second screen in the state in which the first function of the camera application is selected through the first screen, an indication indicating that selection of the first function by the second input related to the subject's gaze or gesture is restricted.

14. The method of claim 13, further comprising:
   identifying, by the electronic device, a third input related to the subject's gaze or gesture for selecting a second function of the camera application; and
   executing, by the electronic device, the second function corresponding to the third input.

15. The method of claim 13, further comprising:
   identifying, by the electronic device, a third input related to the subject's gaze or gesture for selecting a second function of the camera application;
   identifying, by the electronic device, that the third input continues for a predetermined amount of time; and
   in response to the third input continuing for the predetermined amount of time, executing, by the electronic device, the second function corresponding to the third input.

16. The method of claim 15, further comprising:
   displaying, by the electronic device on the first screen, an indication indicating that selection of the second function is restricted while executing the second function corresponding to the third input.

17. The method of claim 15, further comprising:
   displaying, by the electronic device, graphic objects on at least a portion of the second screen, the graphic objects indicating the at least one function of the camera application, respectively; and
   in response to identifying the third input, displaying, by the electronic device, an indication indicating that a graphic object corresponding to the third input is selected among the graphic objects.

18. The method of claim 17, wherein the displaying of the indication indicating that the graphic object corresponding to the third input is selected comprises:
   changing, by the electronic device, a visual effect of the graphic object corresponding to the third input based on a duration of time of the third input.

19. The method of claim 18, wherein the displaying of the indication indicating that the graphic object corresponding to the third input is selected further comprises:
   changing, by the electronic device, at least one of a color effect, a color, or saturation of the graphic object based on a selection of the graphic object corresponding to the third input.

20. The method of claim 13, further comprising:
   identifying, by the electronic device through at least one sensor of the electronic device, a gesture of the subject; and
   selecting, by the electronic device, a function corresponding to the gesture from among the at least one function of the camera application.

21. The method of claim 13, further comprising:
   performing, by the electronic device, face detection to detect a face on the image of the subject obtained by the camera circuitry; and
   extracting, by the electronic device, a gaze direction of the detected face to select a function corresponding to the gaze direction from among the at least one function of the camera application.

* * * * *